United States Patent [19]

Teranishi et al.

[11] Patent Number: 4,888,788
[45] Date of Patent: Dec. 19, 1989

[54] TRANSMITTING AND RECEIVING SYSTEMS

[75] Inventors: Akio Teranishi, Ebina; Nobuo Genji, Osaka; Kohji Itoh, Yokohama, all of Japan

[73] Assignee: Matsushita Electric Industrial Co., Ltd., Osaka, Japan

[21] Appl. No.: 121,101

[22] Filed: Nov. 16, 1987

[30] Foreign Application Priority Data

Nov. 20, 1986 [JP] Japan ................................ 61-277197
Nov. 20, 1986 [JP] Japan ................................ 61-277216
May 11, 1987 [JP] Japan ................................ 62-114152
May 11, 1987 [JP] Japan ................................ 62-114153
Jul. 3, 1987 [JP] Japan ................................ 62-167217

[51] Int. Cl.$^4$ ............................................. H04L 9/00
[52] U.S. Cl. ...................................................... 375/1
[58] Field of Search ................................ 375/1; 380/34

[56] References Cited

U.S. PATENT DOCUMENTS

| 4,017,798 | 4/1977 | Gordy et al. | 375/1 |
| 4,039,749 | 8/1987 | Gordy et al. | 375/1 |
| 4,327,438 | 4/1982 | Baier et al. | 375/1 |
| 4,470,145 | 9/1984 | Williams | 375/1 |
| 4,485,477 | 11/1984 | Nossen | 375/1 |
| 4,528,674 | 7/1985 | Sweeney et al. | 375/1 |
| 4,607,375 | 8/1986 | Lee | 375/1 |
| 4,651,327 | 3/1987 | Fujita | 375/1 |
| 4,706,093 | 11/1987 | Groth, Jr. | 375/1 |
| 4,736,390 | 4/1988 | Ward et al. | 375/1 |
| 4,760,586 | 7/1988 | Takeda | 375/1 |
| 4,774,716 | 8/1988 | Hagmann | 375/1 |

OTHER PUBLICATIONS

Spread Spectrum System–R.C. Dixon, John Wiley & Sons Inc., 1976, pp. 206–215.

*Primary Examiner*—Salvatore Cangialosi
*Attorney, Agent, or Firm*—Stevens, Davis, Miller & Mosher

[57] ABSTRACT

Transmitter and receiver system comprises a transmitter comprising means for generating a pseudo noise code, a first mixer for modulating transmission data by the pseudo noise code, phase shifting means for shifting the phase of a reference frequency signal by 90°, a second mixer for frequency converting an output of the first mixer by one of the reference signal and the phase-shifted reference signal, a third mixer for frequency-converting the pseudo noise code by the other one of the two reference signals, and adding means for adding outputs of said second and third mixers. The system also comprises a receiver comprising means for shifting the phase of the transmitted signal by 90°, arithmetic operating means for multiplying the transmitted signal with the phase shifted signal means, and filter for allowing only the signal regarding the transmission data in an output of the arithmetic operating means to pass.

6 Claims, 5 Drawing Sheets

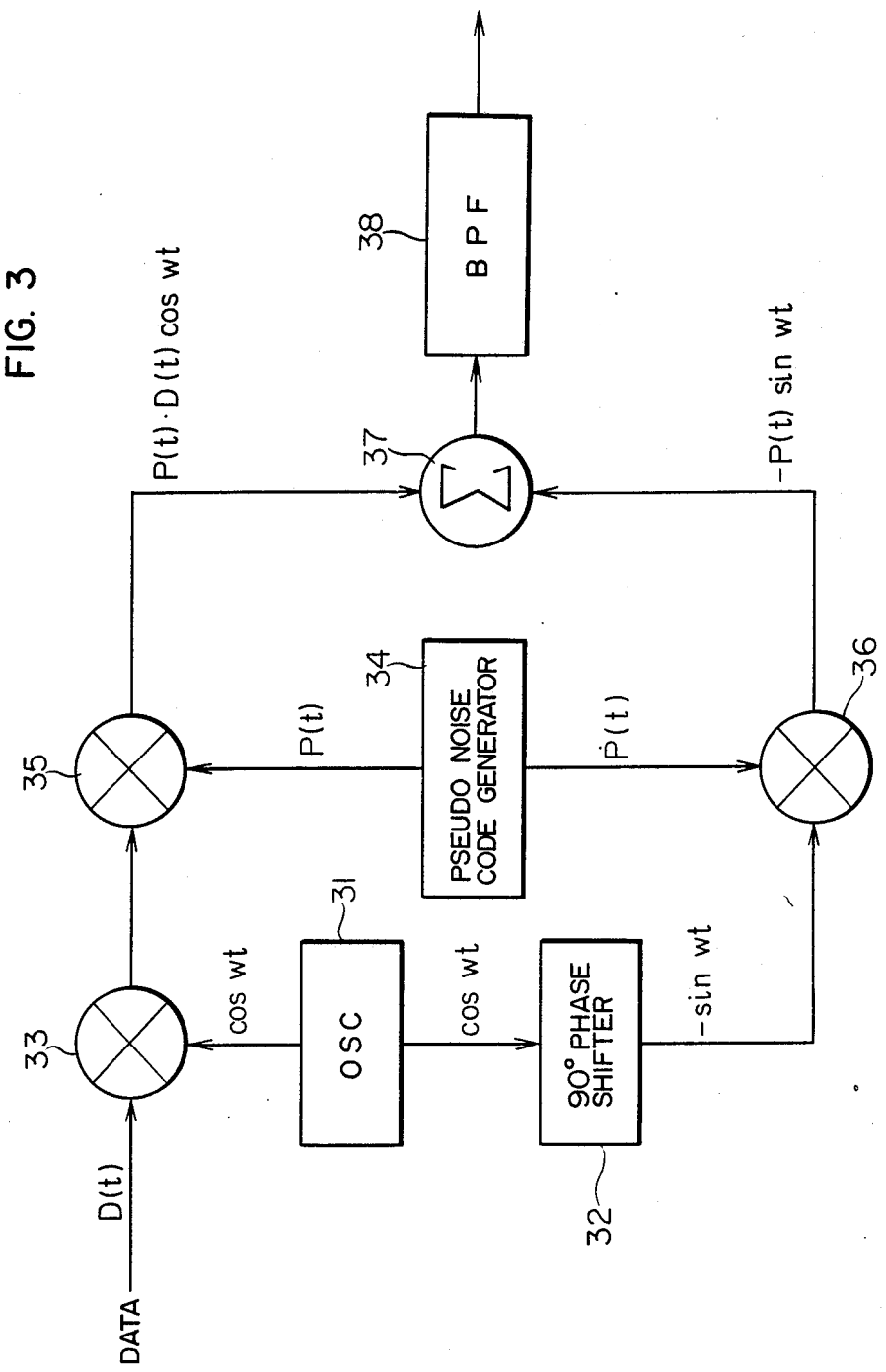

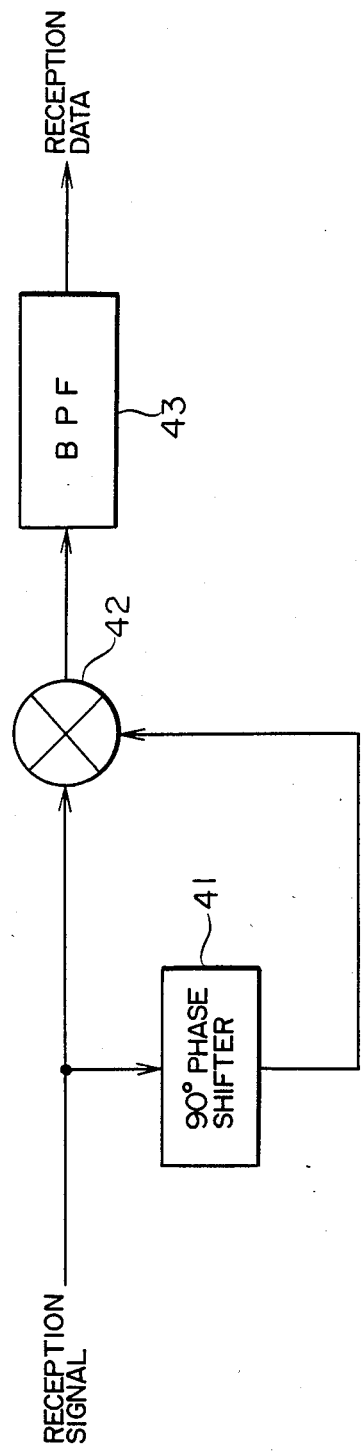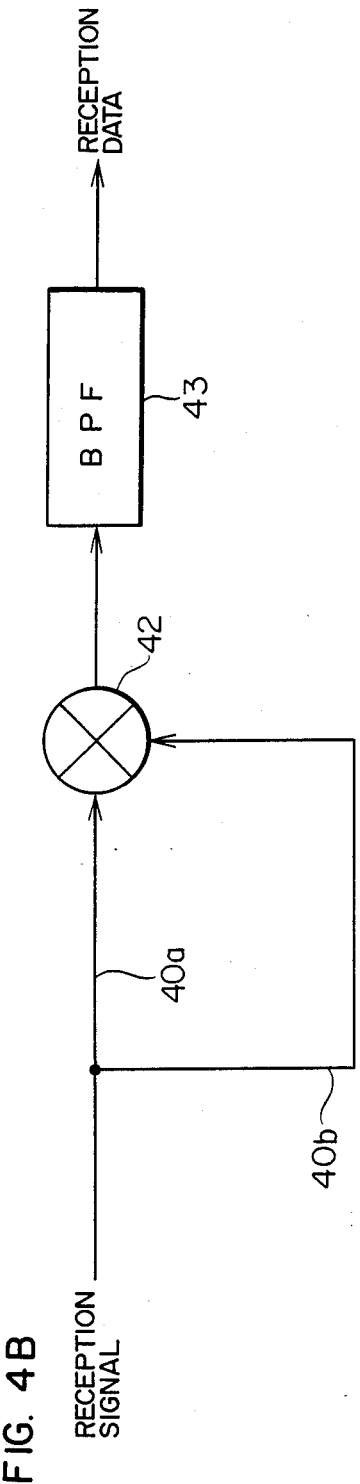
FIG. 4A
FIG. 4B

TRANSMITTING AND RECEIVING SYSTEMS

BACKGROUND OF THE INVENTION

The present invention relates to transmitting and receiving systems.

Recently, a spectrum diffusion system in which the transmitting spectrum is diffused and a wide frequency band is commonly used is attracting attention.

In such a spectrum diffusion system, a kind of code (this code is referred to as a pseudo noise code) is given into the spectrum and modulation is performed and only the signal having the code is demodulated independently of the other signals. By changing the code, a large number of communication channels can be set. On the other hand, as compared with conventional other communication systems, the spread spectrum system has advantages such that it is strong against noise or interference and a message screening from eavesdroppers or low density power spectrum for signal hidding is obtained and the like; therefore, various uses of this technique are being examined.

A spectrum direct spread spectrum system is known as one of the foregoing systems. According to the system, the receiver side needs to obtain synchronization with the pseudo noise code to perform modulation on the transmitter side. In general, a process such as delay lock tracking, taw dither tracking, or the like is performed. (For example, refer to "Spread Spectrum System", R. C. Dixon, John Wiley & Sons Inc., 1976.)

Therefore, in the receiver side, the construction becomes complicated and it takes time to preliminarily obtain synchronization.

SUMMARY OF THE INVENTION

The present invention relates to novel transmitter and receiver systems which do not need such time to obtain the synchronization.

A first transmitter according to the present invention comprises: pseudo noise code generating means for generating a pseudo noise code; a first mixer for modulating transmission data by the pseudo noise code of the pseudo noise code generating means; oscillating means for generating a reference frequency signal; phase shifting means for shifting the phase of the reference frequency signal of the oscillating means by 90°; a second mixer for frequency converting an output of the first mixer by either one of the outputs of the oscillating means and the phase shifting means; a third mixer for frequency converting the pseudo noise code of the pseudo noise code generating means by the other one of the outputs of the oscillating means and the phase shifting means; and adding means for adding outputs of said second and third mixers.

A second transmitter according to the invention comprises; pseudo noise code generating means for generating a pseudo noise code; oscillating means for generating a reference frequency signal; phase shifting means for shifting the phase of the reference frequency signal of the oscillating means by 90°; a first mixer for multiplying one of outputs of the oscillating means and the phase shifting means with the pseudo noise code which is generated from the pseudo noise code generating means; a second mixer for multiplying the other one of the outputs of the oscillating means and the phase shifting means with the pseudo noise code of the pseudo noise code generating means; a third mixer for multiplying an output of the first mixer with data to be transmitted; and adding means for adding outputs of the second and third mixers.

A third transmitter of the invention comprises: oscillating means for generating a reference frequency signal; phase shifting means for shifting the phase of the reference frequency signal of the oscillating means by 90°; a first mixer for frequency converting data to be transmitted by one of outputs of the oscillating means and the phase shifting means; pseudo noise code generating means for generating a pseudo noise code; a second mixer for modulating an output of the first mixer by the pseudo noise code of the pseudo noise code generating means; a third mixer for frequency converting the pseudo noise code of the pseudo noise code generating means by the other one of the outputs of the oscillating means and the phase shifting means; and adding means for adding outputs of the second and third mixers.

On the other hand, for the foregoing first to third transmitters, a first receiver of the present invention comprises: phase shifting means for shifting the phase of a transmission signal by 90°; arithmetic operating means for multiplying the transmission signal with an output of the phase shifting means; and filtering means for allowing only the signals regarding the transmission data in an output of the arithmetic operating means to pass.

A second receiver of the invention comprises: arithmetic operating means for squaring the transmission signal of the foregoing transmitter; and filtering means for allowing only the signals regarding the transmission data in an output of the arithmetic operating means to pass.

A third receiver of the invention comprises: voltage controlled oscillating means for generating a frequency which is almost equal to the frequency generated from the oscillating means for the transmission signal of the transmitter; a first mixer for multiplying the transmission signal with an output of the voltage controlled oscillating means; first phase shifting means for shifting the phase of the output of the voltage controlled oscillating means by 90°; a second mixer for multiplying the transmission signal with an output of the first phase shifting means; a first low pass filter for allowing only the low frequency component in the output of the first mixer to pass; a second low pass filter for allowing only the low frequency component in an output of the second mixer to pass; first adding means for adding outputs of the first and second low pass filters; second adding means for subtracting the output of the second low pass filter from the output of the first low pass filter; a third mixer for multiplying the output of the first low pass filter with the output of the second low pass filter; a fourth mixer for multiplying an output of the first adding means with an output of the second adding means; a third low pass filter for allowing only the low frequency component in an output of the third mixer to pass; a fourth low pass filter for allowing only the low frequency component in an output of the fourth mixer to pass; a fifth mixer for multiplying an output of the third low pass filter with an output of the fourth low pass filter; and a loop filter for allowing a control voltage for controlling the frequency which is generated from the voltage controlled oscillating means to be generated from an output of the fifth mixer.

BRIEF DESCRIPTION OF THE DRAWINGS

FIGS. 1 to 3 are block connection diagrams of main sections of transmitters in the first to third embodiments of the present invention; and FIGS. 4 and 5 are block connection diagrams of main sections of receivers in the first to third embodiments of the invention.

DESCRIPTION OF THE PREFERRED EMBODIMENT

An embodiment of the present invention will be described hereinbelow with reference to the drawings.

Figure 1:
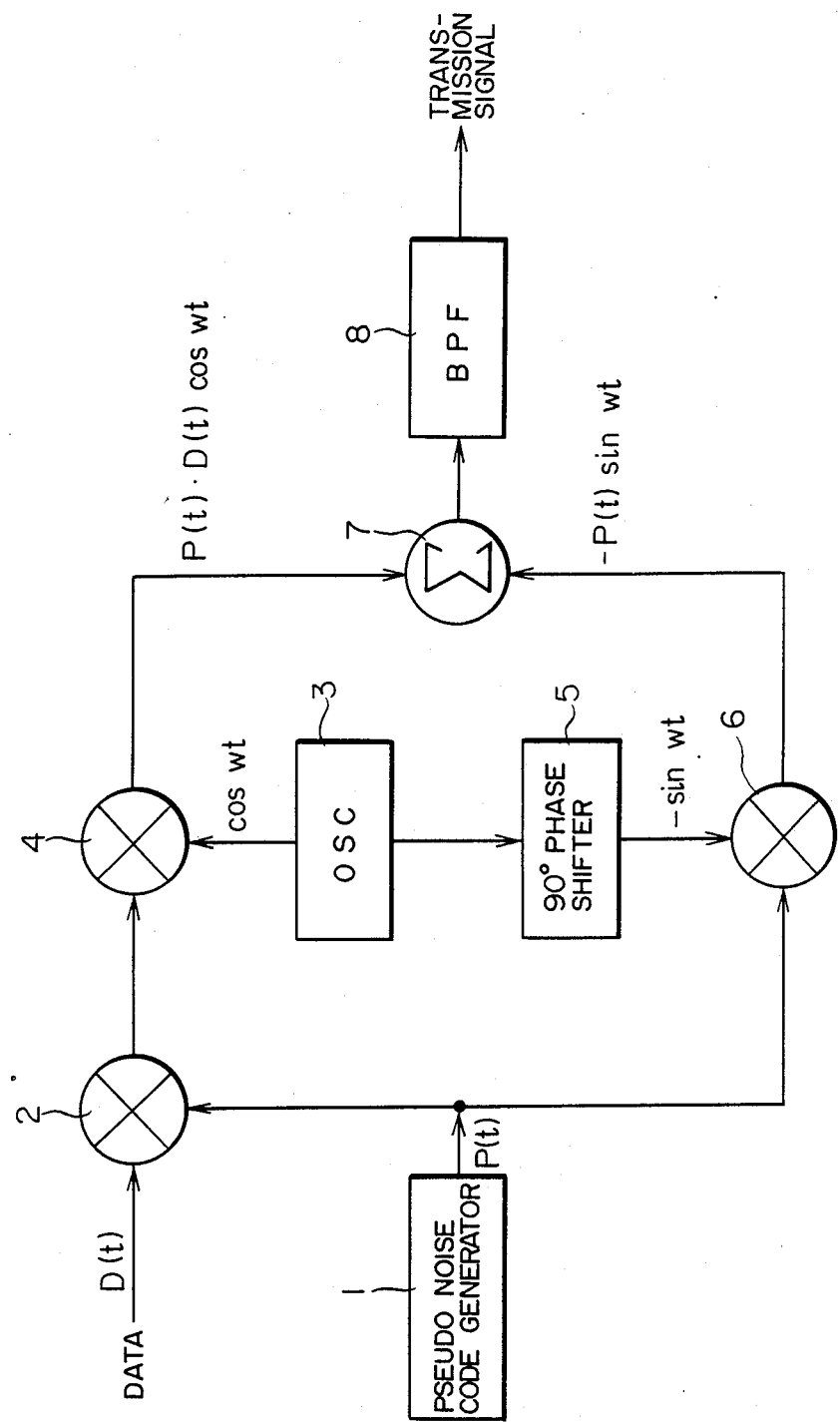

FIG. 1 is a block connection diagram of the main section of a transmitter in the first embodiment of the invention. In FIG. 1, reference numeral 1 denotes a pseudo noise code generator to generate a pseudo noise code P(t); 2 is a mixer to mix data D(t) to be transmitted and the output P(t) of the generator 1; 3 an oscillator to generate a reference frequency signal; 4 a mixer to frequency convert a base band output of the mixer 2 by an output of the oscillator 3; 5 a 90° phase shifter to shift the phase of the reference frequency signal generated from the oscillator 3 by 90°; 6 a mixer to frequency convert the output of the generator 1 by an output of the phase shifter 5; 7 an adder to add outputs of the mixers 4 and 6; and 8 a band pass filter for allowing only the necessary frequency band in an output of the adder 7 to pass. It is assumed that each of the mixers 2, 4, and 6 performs double-phase modulation as a double balance mixer.

The operation of the FIG. 1 transmitted will now be described.

First, the data D(t) to be transmitted is mixed by the mixer 2 with the pseudo noise code P(t) which is generated from the generator 1. The modulation signal of the mixer 2 is further supplied to the mixer 4 and frequency converted by the reference frequency signal which is generated from the oscillator 3. For example, assuming that the reference frequency signal of the oscillator 3 is set to cos ωt (where, ω is an angular frequency which lies within a range from tens of MHz to hundreds of MHz), an output of the mixer 4 becomes P(t)·D(t)·cos ωt.

(Where, P(t) is the pseudo noise code of the generator 1 and P(t)=+1 or −1. D(t) is the data to be transmitted and D(t)=+1 or −1.)

On the other hand, the reference frequency signal cos ωt of the oscillator 3 is also sent to the 90° phase shifter 5 and is phase converted to −sin ωt. Thereafter, the pseudo noise code transmitted from the generator 1 is frequency converted by the mixer 6 and the signal of −P(t)·sin ωt is outputted.

Next, the adder 7 adds the outputs of the mixers 4 and 6 and sends the signal of P(t)·D(t)·cos ωt−P(t)·sin ωt    (1)

to the band pass filter 8.

The band pass filter 8 eliminates high frequency components, a DC component, noise, or the like which were caused in the mixers 2, 4, and 6 and transmits the resultant signal as the transmission signal to a receiver side through an antenna or a signal line.

As described above, in the transmitter of the embodiment, after the data to be transmitted was modulated by the pseudo noise code P(t) as the output of the pseudo noise code generator 1, it is frequency converted by the reference frequency by the oscillator 3 and 90° phase shifter 5. The cosine component including the pseudo noise code and the data and the sine component having only the pseudo noise code can be synthesized and transmitted.

In the embodiment, the reference frequency signal of the oscillator 3 has been transmitted to the mixer 4 and through the 90° phase shifter 5 to the mixer 6, respectively. However, the 90° phase shifter 5 may be also arranged between the oscillator 3 and the mixer 4 instead of the position between the oscillator 3 and the mixer 6.

A second embodiment of the transmitter of the invention will now be described hereinbelow.

Figure 2:
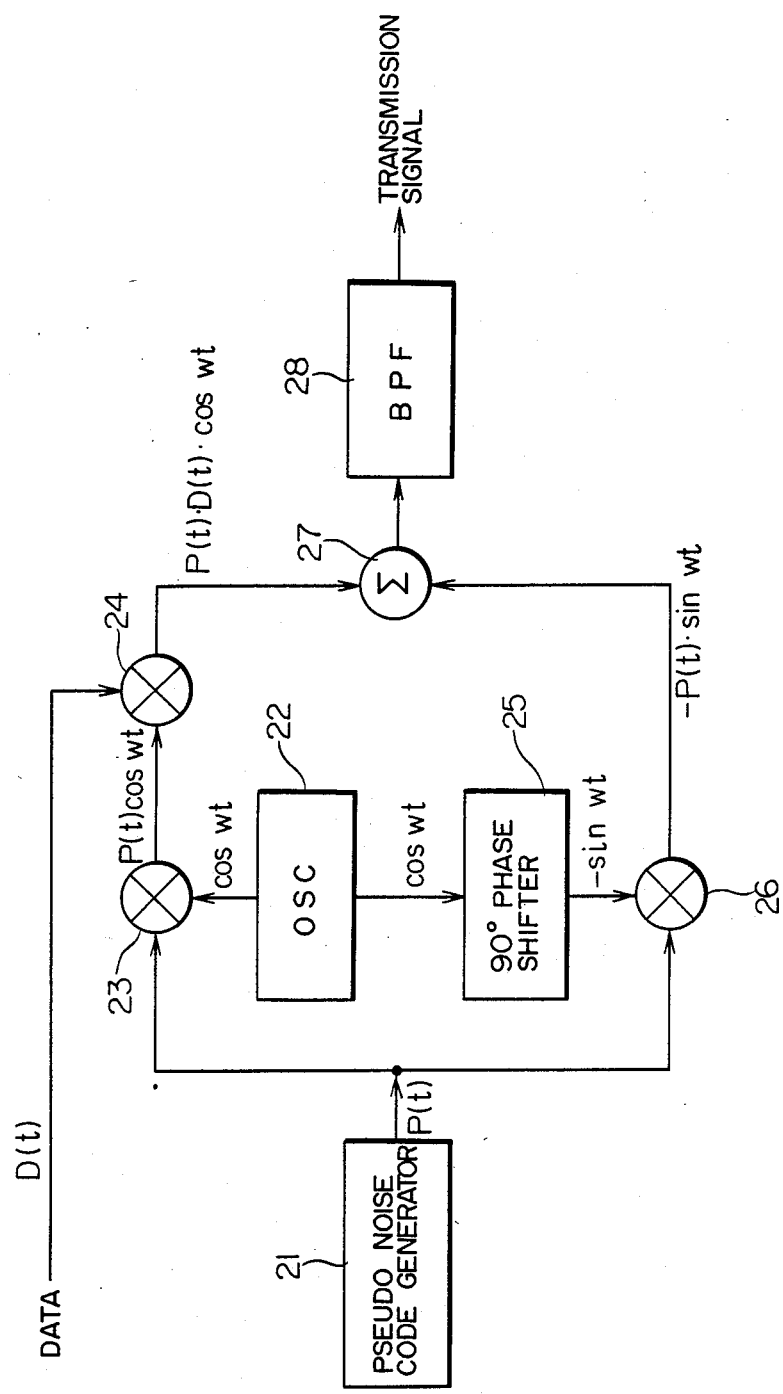

FIG. 2 is a block connection diagram of a main section of the transmitting system in the second embodiment of the invention. In FIG. 2, reference numeral 21 denotes a pseudo noise code generator to generate the pseudo noise code P(t); 22 is an oscillator to generate a reference frequency signal; 23 a mixer to multiply the pseudo noise code P(t) which is generated from the generator 21 with the reference frequency signal which is generated from the oscillator 22; 24 a mixer to multiply an output of the mixer 23 with the data D(t) to be transmitted; 25 a 90° phase shifter to shift the phase of the reference frequency signal generated from the oscillator 22 by 90°; 26 a mixer to multiply the output of the generator 21 with an output of the phase shifter 25; 27 an adder to add outputs of the mixers 24 and 26; and 28 a band pass filter for allowing only the necessary frequency band in an output of the adder 27 to pass. It is assumed that each of the mixers 23, 24, and 26 performs the double-phase modulation as a double balance mixer.

The operation of the FIG. 2 embodiment will now be described.

The pseudo noise code P(t) which is generated from the generator 21 and the reference frequency signal which is generated from the oscillator 22 are multiplied by the mixer 23. The output of the mixer 23 is further multiplied by the mixer 24 with the data D(t) to be transmitted. For example, assuming that the reference frequency signal of the oscillator 22 is cos ωt (where, t is a time and ω is the angular frequency which lies within a range from tens of MHz to hundreds of MHz), the output of the mixer 23 becomes P(t) cos ωt and the output of the mixer 24 becomes P(t)·D(t) cos ωt.

(Where, P(t) is the pseudo noise code of the generator 1 and P(t)=+1 or −1. On the other hand, D(t) is the data to be transmitted and D(t)=+1 or −1.)

On the other hand, the reference frequency signal cos ωt of the oscillator 22 is also sent to the 90° phase shifter 25 and phase converted into −sin ωt. Thereafter, it is multiplied with the pseudo noise code generated from the generator 21 by the mixer 26 and the signal of −P(t)·sin ωt is outputted.

Next, the adder 27 adds the outputs of the mixers 24 and 26 and transmits the signal of P(t)·D(t)·cos ω−P(t)·sin ωt    (1)

to the band pass filter 28.

The band pass filter 28 eliminates high frequency components, a DC component, noise, or the like which were caused in the mixers 23, 24, and 26 and transmits the resultant signal as the transmission signal to the receiver side through an antenna or a signal line.

As described above, in the transmitter of this embodiment, the cosine component including the pseudo noise code P(t) generated from the pseudo noise code generator 21 and the data D(t) to be transmitted and the sine component having only the same pseudo noise code can be synthesized and transmitted.

The third embodiment of the invention will be described hereinbelow with reference to the drawings.

FIG. 3 is a block connection diagram of a main section of a transmitter in the third embodiment of the invention. In FIG. 3, reference numeral 31 denotes an oscillator to generate a reference frequency signal; 32 is a 90° phase shifter to shift the phase of the reference frequency signal generated from the oscillator 31 by 90°; 32 a mixer to frequency convert the data to be transmitted by an output of the oscillator 31; 34 a pseudo noise code generator to generate a pseudo noise code; 35 a mixer to modulate an output of the mixer 33 by the pseudo noise code as the output of the generator 34; 36 a mixer to frequency convert the output of the generator 34 by an output of the 90° phase shifter 32; 37 an adder to add outputs of the mixers 35 and 36; and 38 a band pass filter for allowing only the necessary frequency band in an output of the adder 37 to pass. It is assumed that each of the mixers 33, 35, and 36 performs the double-phase modulation as a double balance mixer.

The operation of the FIG. 3 embodiment will now be described.

First, the data D(t) to be transmitted is double-phase modulated by the mixer 33 by the reference frequency signal which is generated from the oscillator 31 and thereafter, it is modulated by the mixer 35 by the pseudo noise code P(t) which is generated from the generator 34. For example, assuming that the reference frequency signal of the oscillator 31 is cos ωt (where, ω is the angular frequency which lies within a range from tens a MHz to hundreds of MHz), the output of the mixer 35 becomes P(t)·D(t)·cos ωt.

(Where, P(t) is the pseudo noise code of the pseudo noise code generator 34 and P(t)=+1 or −1. On the other hand, D(t) is the data to be transmitted and D(t)=+1 or −1.)

On the other hand, the reference frequency signal cos ωt of the oscillator 31 is also transmitted to the 90° phase shifter and phase converted into −sin ωt. Thereafter, it is frequency converted by the mixer 36 by the false noise code P(t) which is generated from the generator 34, so that the signal of −P(t)·sin ω is outputted.

Next, the adder 37 adds the outputs of the mixers 35 and 36 and transmits the signal of $$P(t)\cdot D(t)\cdot \cos \omega - P(t)\cdot \sin \omega t \quad (1)$$

to the band pass filter 38.

The band pass filter 38 eliminates high frequency components, a DC component, noise, or the like which were caused by the mixers 33, 35, and 36 and transmits the resultant signal as the transmission signal to the receiver side through an antenna or a signal line.

As described above, in the transmitter of this embodiment, after the data to be transmitted was frequency converted by the reference frequency which is generated from the oscillator 31, it is modulated by the pseudo noise code as the output of the pseudo noise code generator 34. The cosine component including the pseudo noise code and the data to be transmitted and the sine component having only the pseudo noise code are synthesized and transmitted.

In this embodiment, the reference frequency signal of the oscillator 31 has been transmitted to the mixer 33 and through the 90° phase shifter 32 to the mixer 36. However, the 90° phase shifter 32 may be also arranged between the oscillator 31 and the mixer 33 instead of the position between the oscillator 31 and the mixer 36.

A constitution of a receiver in the first embodiment of the present invention will now be described.

FIG. 4A shows a block connection diagram of a main section of the receiver in the first embodiment of the invention. In FIG. 4A, reference numeral 41 denotes a 90° phase shifter to shift the phase of the reception signal by 90°; 42 is mixer to multiply the reception signal with an output of the 90° phase shifter 41; and 43 a band pass filter for allowing only the component including the transmission data in an output of the mixer 42 to pass.

The operation of the FIG. 4A receiver will now be described.

First, the signal of the equation (1) which was transmitted from each of the transmitters shown in FIGS. 1, 2 and 3 is transmitted as a reception signal to the 90° phase shifter 41 and phase converted to the following equation (2).

$$-P(t)\cdot D(t)\cdot \sin \omega t - P(t)\cdot \cos \omega t \quad (2)$$

Next, the mixer 42 multiplies the equations (1) and (2), so that the output of the mixer 42 becomes $$-P(t)^2\cdot D(t)^2\cdot \sin \omega t\cdot \cos \omega t + P(t)^2\cdot \sin \omega t \cos \omega t + P(t)^2\cdot D(t)\cdot \sin^2 \omega t - P(t)^2\cdot D(t)\cdot \cos^2 \omega t \quad (3)$$

Since $P(t)=+1$ and $D(t)=+1$, $P(t)^2=D(t)^2=1$, so that the equation (2) becomes $$-D(t)(\cos^2 \omega t - \sin^2 \omega t) = -D(t)\cos 2\omega t \quad (4)$$

This output is sent to the band pass filter 43. The band pass filter 43 eliminates the DC component or high frequency component which is caused due to the nonlinearity of the mixer 42 and allows only $-D(t)\cos 2\omega t$ including the transmission data D(t) to pass. $-D(t)\cdot \cos 2\omega t$ is the signal which was double-phase modulated by the transmission data D(t) at the frequency of $2\omega/2\pi$ and does not include the pseudo noise code P(t) which was used for the spectrum spread. Therefore, to demodulate the transmission data D(t) from the equation (4), it can be easily demodulated by the well-known means (for example, costas loop demodulation, bit delay detection, or the like) for demodulating the double-phase modulated signal. The transmission data D(t) which was modulated by the transmitters in FIGS. 1 to 3 is demodulated by the receiver of FIG. 4A as explained above.

In the embodiment of FIG. 4A, the explanation has been made on the assumption that the transmission signal from each of the band pass filters 8, 28, and 38 in FIGS. 1 to 3 is directly received by the receiving system of FIG. 4A. However, it is also possible to constitute in a manner such that only the necessary band is received through a filter as necessary and amplified by a preamplifier and thereafter, it is converted into the intermediate frequency by a local oscillator and amplified by an intermediate amplifier and this amplified signal is used as the reception signal. In this case, the angular frequency ω shown in the equations (2), (3), and (4) is converted into the intermediate frequency ω′. However, the signal which is obtained from the band pass filter 43 is FIG. 4A is also equal to $-D(t) \cos 2\omega t$, so that no problem occurs.

On the other hand, when a mixer 42 has the linear characteristic, the band pass filter 43 can be also omitted.

A receiver in a second embodiment of the invention will now be explained.

FIG. 4B shows a block connection diagram of a main section of the receiver in the second embodiment of the invention. In FIG. 4B, reference numeral 42 denotes the mixer to multiply reception signals which are transmitted from both lines 40a and 40b; and 43 indicates the band pass filter for allowing only the component including the transmission data in an output of the mixer 42 to pass.

The operation of the FIG. 4B receiver will now be described hereinbelow.

First, the signal of the equation (1) transmitted from each of the transmitters shown in FIGS. 1, 2 and 3 is squared by the mixer 42 and the following output is obtained.

$$P(t)^2 \cdot D(t)^2 \cos^2\omega t + P(t)^2 \sin^2\omega t - 2P(t)^2 \cdot D(t) \cdot \sin\omega t \cdot \cos\omega t \quad (5)$$

where, $P(t) = \pm 1$ and $D(t) = \pm 1$. Therefore, $P(t)^{2pl} = D(t)^2 = 1$. From the equation (5), the output of $$1 - D(t) \sin 2\omega t \quad (6)$$

is transmitted to the band pass filter 43.

The band pass filter 43 allows only $$-D(t) \sin 2\omega t \quad (7)$$

in the equation (6) to pass. This signal is the signal which was double-phase modulated by the transmission data $D(t)$ by the center frequency $2\omega/2\pi$ and does not include the pseudo noise code $P(t)$ which was used for the spread of spectrum. Since the equation (7) indicates the double-phase modulation signal, in order to demodulate the transmission data $D(t)$ from this equation, it can be easily demodulated by well-known means (for example, costas loop demodulation, bit delay detection, or the like) for demodulating the double-phase modulated signal. Therefore, the transmission data $D(t)$ which was modulated by each of the transmitters of FIGS. 1, 2 and 3 is demodulated by the receiving system of FIG. 4B.

In the embodiment of FIG. 4B, the explanation has been made on the assumption that the signal obtained from each of the band pass filters 8, 28, and 38 in FIGS. 1 to 3 is directly received by the receiver of FIG. 4B. However, it is also possible to constitute in a manner such that only the necessary band is received through the filter as necessary and amplified by a preamplifier and thereafter, it is converted into the intermediate frequency by a local oscillator and amplified by an intermediate amplifier, and this amplified signal is used as the reception signal. In this case, the angular frequency $\omega$ shown in the equations (5), (6), and (7) is converted into the intermediate frequency $\omega'$. However, since the signal which is obtained from the band pass filter 43 in FIG. 4B is also equal to $-D(t) \sin 2\omega t$, no problem occurs. On the other hand, although the reception signal has been squared by the mixer 42, this squaring process can be also performed by other arithmetic operating circuit.

A constitution of a receiver in the third embodiment of the invention will now be explained.

Figure 5:
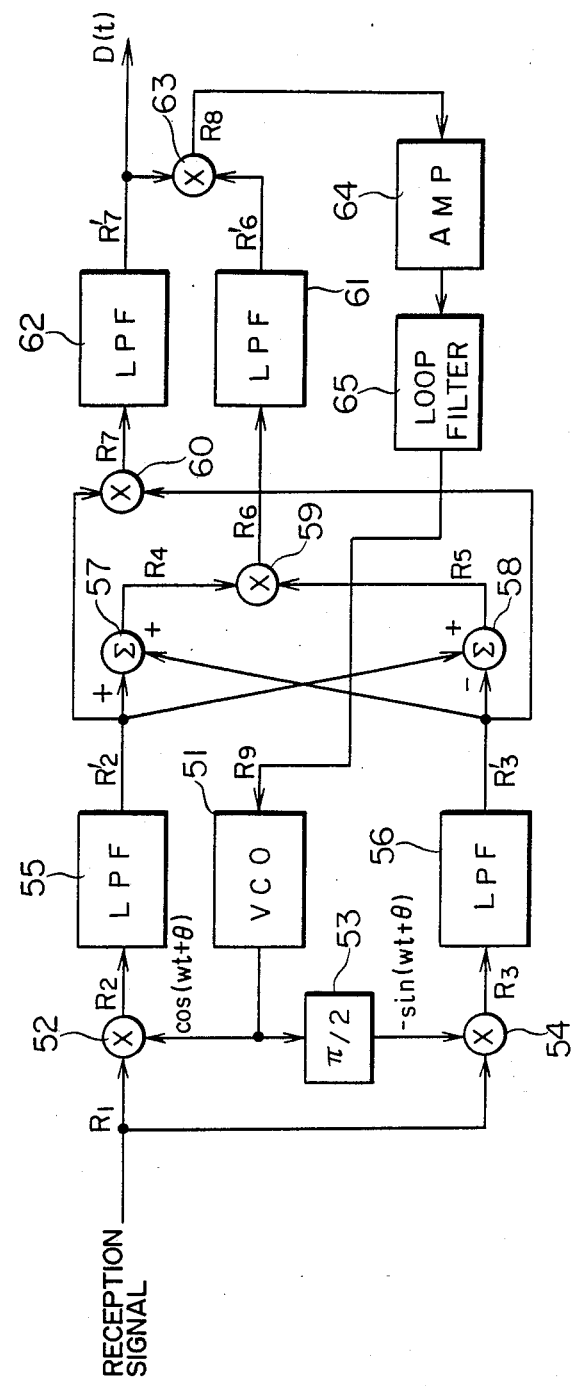

FIG. 5 shows a block connection diagram of a main section of the receiver in the third embodiment of the invention.

In FIG. 5, reference numeral 51 denotes a voltage controlled oscillator to generate a frequency which is almost equal to the frequency which is generated by the oscillator 3 or 22 in the transmitter; 52 is a mixer to multiply the reception signal with an output of the oscillator 51; 53 a 90° phase shifter to shift the phase of the output of the oscillator 51 by 90°; 54 a mixer to multiply the reception signal with an output of the 90° phase shifter 53; 55 a low pass filter for allowing only the low frequency component in an output of the mixer 52 to pass; 56 a low pass filter for allowing the low frequency component in an output of the mixer 54 to pass; 57 an adder to add outputs of the low pass filters 55 and 56; 58 an adder to subtract the output of the low pass filter 56 from the output of the low pass filter 55; 59 a mixer to multiply an output of the adder 57 with an output of the adder 58; 60 a mixer to multiply the output of the low pass filter 55 with the output of the low pass filter 56; 61 a low pass filter for allowing only the low frequency component in an output of the mixer 59 to pass; 62 a low pass filter for allowing only the low frequency component in an output of the mixer 60 to pass; 63 a mixer to multiply an output of the low pass filter 61 with an output of the low pass filter 62; 64 an amplifier to amplify an output of the mixer 63; 65 a loop filter to generate a signal to control the voltage controlled oscillator 51 by an output of the amplifier 64.

The operation of the FIG. 5 receiver will now be described hereinbelow.

First, the signal in the equation (1) which was transmitted from each of the transmitters shown in FIGS. 1, 2 and 3 is multiplexed with the signal $$\cos(\omega t + \theta_{(t)}) \quad (8)$$

which is generated from the voltage controlled oscillator by the mixer 52. In this case, the frequency of the output of the oscillator 51 assumes $\omega/2\pi$ and the phase assumes $\theta_{(t)}$. An output $R_2$ of the mixer 52 becomes as shown by the equation (9) from the equations (1) and (8).

$$\begin{aligned}
R_2 &= (P(t) \cdot D(t) \cdot \cos\omega t - P(t) \sin\omega t) \cos(\omega t + \theta) \quad (9)\\
&= \frac{P(t) \cdot D(t)}{2} (\cos(2\omega t + \theta) + \cos\theta) -\\
&\quad \frac{P(t)}{2} (\sin(2\omega t + \theta) - \sin\theta)
\end{aligned}$$

The high frequency component of the frequency $2\omega/2\pi$ is eliminated from the output $R_2$ by the low pass filter 55, so that an output $R_2'$ $$R_2' = \frac{P(t)}{2} (D(t) \cos\theta + \sin\theta) \quad (10)$$

is obtained.

On the other hand, the phase of the output of the oscillator 51 is shifted by 90° by the 90° phase shifter 53 and becomes $$-\sin(\omega t + \theta_{(t)}) \quad (11)$$

This output is multiplied with the signal in the equation (1) by the mixer 54, so that the signal $R_3$ is derived.

$$R_3 = (P(t) \cdot D(t) \cdot \cos \omega t - P(t) \sin \omega t)(-\sin(\omega t + \theta)) \quad (12)$$
$$= -\frac{P(t) \cdot D(t)}{2}(\sin(2\omega t + \theta) + \sin \theta) -$$
$$\frac{P(t)}{2}(\cos(2\omega t + \theta) - \cos \theta)$$

The component of the frequency $2\omega/2\pi$ is eliminated from the signal $R_3$ by the low pass filter 56 and the signal $R_3'$ is derived.

$$R_3' = -\frac{P(t)}{2}(D(t) \sin \theta - \cos \theta) \quad (13)$$

The output $R_2'$ of the low pass filter 55 and the output $R_3'$ of the low pass filter 56 are added by the adder 57, so that an output $R_4$ is obtained.

$$R_4 = \frac{P(t)}{2}\{D(t)(\cos \theta - \sin \theta) + (\sin \theta + \cos \theta)\} \quad (14)$$

On the other hand, the output $R_3'$ of the low pass filter 56 is subtracted from the output $R_2'$ of the low pass filter 55 by the adder 58, so that an output $R_5$ is derived.

$$R_5 = \frac{P(t)}{2}\{D(t)(\cos \theta + \sin \theta) + (\sin \theta - \cos \theta)\} \quad (15)$$

The output $R_4$ of the adder 57 and the output $R_5$ of the adder 58 are multiplied by the mixer 59, so than an output $R_6$ is derived as follows by the equations (14) and (15).

$$R_6 = \frac{P(t)^2}{4}\{D(t)^2(\cos^2 \theta - \sin^2 \theta) + \sin^2 \theta - \cos^2 \theta + D(t)((\sin \theta + \cos \theta)^2 - (\sin \theta - \cos \theta)^2)\} \quad (16)$$

Since $P(t) = \pm 1$ and $D(t) = \pm 1$, then $P(t)^2 = D(t)^2 = 1$ and the equation (16) becomes $$R_6 = \frac{D(t)}{2} \sin 2\theta \quad (17)$$

Further, harmonic components and noise which were caused by the non-linear effect of the mixer 59 are eliminated by the low pass filter 61, so that an output $R_6'$ is obtained.

$$R_6' = R_6 = \frac{D(t)}{2} \sin 2\theta \quad (18)$$

Similarly, the output $R_2'$ of the low pass filter 55 and the output $R_3'$ of the low pass filter 56 are multiplied by the mixer 60, so that an output $R_7$ is obtained. The output $R_7$ is further processed by the low pass filter 62, so that a signal $R_7'$ is derived.

$$R_7' = R_7 = \frac{D(t)}{4} \cos 2\theta \quad (19)$$

The output $R_6'$ of the low pass filter 71 and the output $R_7'$ of the low pass filter 62 are multiplied by the mixer 63, so that an output $R_8$ is obtained by the equations (18) and (19).

$$R_8 = \frac{D(t)^2}{8} \sin 2\theta \cdot \cos 2\theta \quad (20)$$

Since $D(t)^2 = 1$, the equation (20) becomes as follows.

$$R_8 = \frac{1}{16} \sin 4\theta \quad (21)$$

The output $R_8$ of the mixer 63 is amplified by the amplifier 64 and the frequency band is limited by the loop filter 65 as necessary. The resultant signal is supplied to the voltage controlled oscillator 51, thereby controlling the oscillator 51 so that $\theta_{(t)}$ in the equation (21) becomes $$\theta_{(t)} = 0 \quad (22)$$

By forming a loop with the foregoing constitution, the output $R_7'$ of the low pass filter 62 becomes as follows by the equations (19) and (22).

$$R_7' = \frac{D(t)}{4} \quad (23)$$

This is the same as the transmission data. Namely, the transmission data D(t) which was modulated by each of the transmitters in FIGS. 1, 2 and 3 is demodulated by the receiver of FIG. 5.

In the embodiment of FIG. 5, the explanation has been made on the assumption that the signal from each of the band pass filters 8 and 28 in FIGS. 1 and 2 is directly received by the receiver of FIG. 5. However, it is also possible to constitute in a manner such that only the necessary band is received through a filter as necessary and amplified by a preamplifier and thereafter, it is converted into an intermediate frequency by a local oscillator and amplified by an intermediate amplifier, and this amplified signal is used as the reception signal.

In this case, although the angular frequency $\omega$ shown in the equations (8), (9), (11), and (12) is converted into the intermediate frequency $\omega'$, the signal obtained from the low pass filter 62 in FIG. 5 is also equal to D(t)/4 and no problem occurs.

On the other hand, when the mixers 59 and 60 have the linear characteristics, the low pass filters 61 and 62 can be also omitted. Further, when the output level of the mixer 62 is enough high, the amplifier 64 can be also omitted.

What is claimed is:

1. A transmission/reception system comprising:
   (I) a transmitter having
      pseudo noise code generating means for generating a pseudo noise code,
      a first mixer for modulating transmission data by the pseudo noise code of said code generating means,
      oscillating means for generating a reference frequency signal,
      phase shifting means for shifting the phase of the reference frequency signal of said oscillating means by 90°,
      a second mixer for frequency converting an output of said first mixer by one of outputs of said oscillating means and said phase shifting means, a third mixer for frequency converting the pseudo noise code of said code generating means by the other one of the outputs of the oscillating means and the phase shifting means, and adding means for adding outputs of said second and third mixers; and (II) a receiver having phase shifting means for shifting the phase of the transmission signal of said transmitter by 90°, arithmetic operating means for multiplying said transmission signal with an output of said phase shifting means, and filtering means for allowing only a signal containing said transmission data in an output of said arithmetic operating means to pass.

2. A transmitting/receiving system comprising:

(I) a transmitter having pseudo noise code generating means for generating a pseudo noise code, a first mixer for modulating transmission data by the pseudo noise code of said code generating means, oscillating means for generating a reference frequency signal, phase shifting means for shifting the phase of the reference frequency signal of said oscillating means by 90°, a second mixer for frequency converting an output of said first mixer by one of outputs of said oscillating means and said phase shifting means, a third mixer for frequency converting the pseudo noise code of said code generating means by the other one of the outputs of the oscillating means and the phase shifting means, and adding means for adding outputs of said second and third mixers; and (II) a receiver having arithmetic operating means for squaring the transmission signal of said transmitter, and filtering means for allowing only a signal containing said transmission data in an output of said arithmetic operating means to pass.

3. A transmitting/receiving system comprising:

(I) a transmitting system having pseudo noise code generating means for generating a pseudo noise code, oscillating means for generating a reference frequency signal, a phase shifting means for shifting the phase of the reference frequency signal of said oscillating means by 90°, a first mixer for multiplying one of outputs of said oscillating means and said phase shifting means with the pseudo noise code which is generating from said code generating means, a second mixer for multiplying the other one of the outputs of the oscillating means and the phase shifting means with the pseudo noise code of said code generating means, a third mixer for multiplying an output of the first mixer with data to be transmitted, and adding means for adding outputs of said second and third mixers; and (II) a receiving system having phase shifting means for shifting the phase of the transmission signal of said transmitting system by 90°, arithmetic operating means for multiplying said transmission signal with an output of said phase shifting means, and filtering means for allowing only a signal containing the transmission data in an output of said arithmetic operating means to pass.

4. A transmitting/receiving system comprising:

(I) a transmitting system having pseudo noise code generating means for generating a pseudo noise code, oscillating means for generating a reference frequency signal, phase shifting means for shifting the phase of the reference frequency signal of said oscillating means by 90°, a first mixer for multiplying one of outputs of said oscillating means and said phase shifting means with the pseudo noise code which is generated from said code generating means, a second mixer for multiplying the other one of the outputs of the oscillating means and the phase shifting means with the pseudo noise code of said code generating means, a third mixer for multiplying the output of the first mixer with data to be transmitted, and adding means for adding outputs of said second and third mixers; and (II) a receiving system having arithmetic operating means for squaring the transmission signal of said transmitting system, and filtering means for allowing only a signal containing the transmission data in an output of said arithmetic operating means to pass.

5. A transmitting/receiving system comprising:

(I) a transmitting system having oscillating means for generating a reference frequency signal, phase shifting means for shifting the phase of the reference frequency signal of said oscillating means by 90°, a first mixer for frequency converting data to be transmitted by one of outputs of said oscillating means and said phase shifting means, pseudo noise code generating means for generating a pseudo noise code, second mixer for modulating an output of said first mixer by the pseudo noise code of said code generating means, a third mixer for frequency converting the pseudo noise code of said code generating means by the other one of the outputs of the oscillating means and the phase shifting means, and adding means for adding outputs of said second and third mixers; and (II) a receiving system having phase shifting means for shifting the phase of the transmission signal of said transmitting system by 90°, arithmetic operating means for multiplying the transmission signal with an output of said phase shifting means, and filtering means for allowing only a signal containing the transmission data in an output of said arithmetic operating means to pass.

6. A transmitting/receiving system comprising:

(I) a transmitting system having oscillating means for generating a reference frequency signal, phase shifting means for shifting the phase of the reference frequency signal of the oscillating means by 90°, a first mixer for frequency converting data to be transmitted by one of outputs of said oscillating means and said phase shifting means, pseudo noise code generating means for generating a pseudo noise code, a second mixer for modulating an output of said first mixer by the pseudo noise code of said code generating means, a third mixer for frequency converting the pseudo noise code of said code generating means by the other one of the outputs of the oscillating means and the phase shifting means, and adding means for adding outputs of said second and third mixers; and (II) a receiving system having arithmetic operating means for squaring the transmission signal of said transmitting system, and filtering means for allowing only a signal containing the transmission data in an output of said arithmetic operating means to pass.

* * * * *